United States Patent [19]

Soper et al.

[11] 4,089,102

[45] May 16, 1978

[54] METHOD OF FORMING AND USING A LENS HOLDER

[75] Inventors: Peter Henry Hunt Soper, Rugby; Michael John Meehan, Crick; John Reginald Rouse, Rugby, all of England

[73] Assignee: Autoflow Engineering Limited, England

[21] Appl. No.: 690,367

[22] Filed: May 26, 1976

[30] Foreign Application Priority Data

Oct. 23, 1975 United Kingdom ............ 43609/75

[51] Int. Cl.² .................. B22D 19/06; B24B 13/00
[52] U.S. Cl. .................... 29/527.5; 29/559; 51/216 LP; 164/98; 425/808
[58] Field of Search ............ 425/808; 269/21; 164/98; 51/216 LP, 217 L; 29/527.5, 559

[56] References Cited

U.S. PATENT DOCUMENTS

| 3,794,314 | 2/1974 | Coburn et al. | 269/21 |
|---|---|---|---|
| 3,881,683 | 5/1975 | Whitney | 425/808 X |
| 3,951,203 | 4/1976 | Prunier | 425/808 X |

FOREIGN PATENT DOCUMENTS 630,402 10/1949 United Kingdom ............ 51/216 LP

Primary Examiner—Robert D. Baldwin
Attorney, Agent, or Firm—Hauke & Patalidis

[57] ABSTRACT

A method of forming a lens holder comprising mounting a support member in a lens-holding body, forming at least one contact surface on the support member, positioning a former on the contact surface such that a curved surface defined by the former engages the contact surface, introducing a settable mass of flowable material into a cavity between the curved surface and the lens-holding body, and removing the former from the contact surface after the material has set. The set material defines a surface for supporting a lens having a curved surface substantially corresponding to the curved surface to the former. A plurality of support members may be formed by the method of the invention on a single lens holder.

19 Claims, 7 Drawing Figures

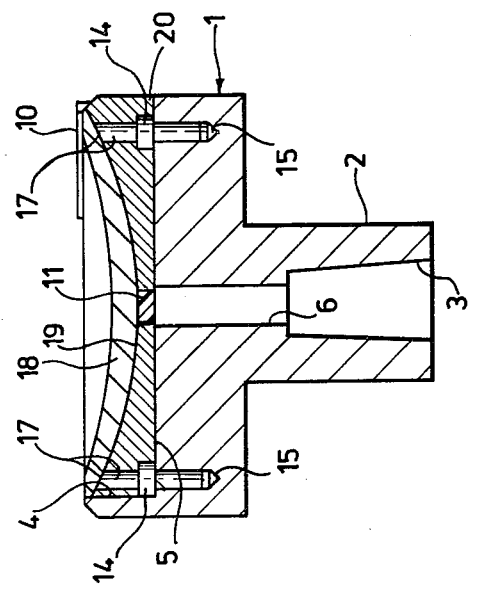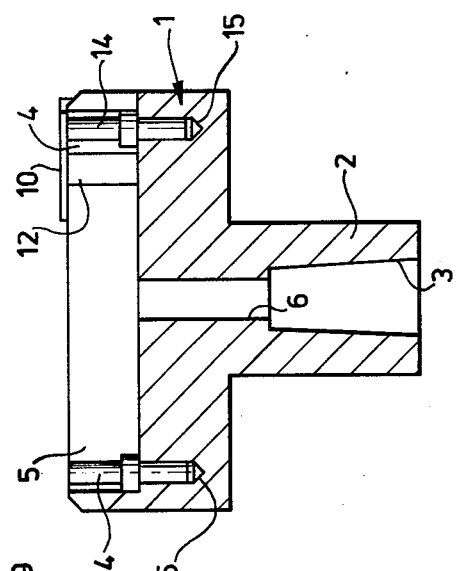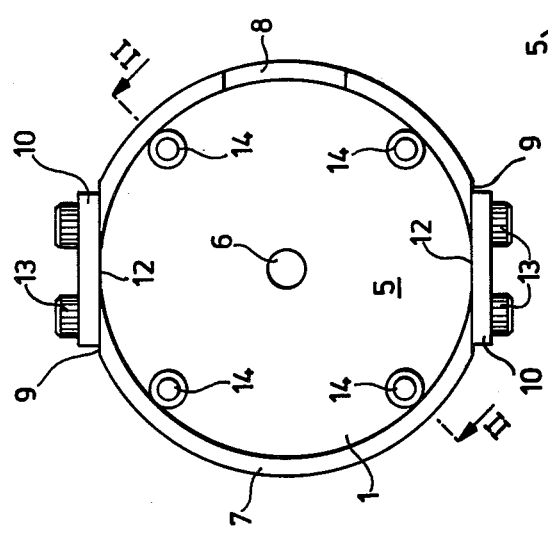

METHOD OF FORMING AND USING A LENS HOLDER

The invention relates to improvements in or relating to a lens holder.

Various methods of supporting lenses in lens holders are known. For example, in our British Pat. No. 1,262,489, there is described a method in which a lens is attached to a button by means of a settable mass of flowable material in the form of a low melting point alloy which adheres to one of the lens faces, the button subsequently being located in a lens holder. Such a method has been found satisfactory when manufacturing lenses in samll quantities, but is time consuming where lenses are to be mass-produced as each lens has to be manually attached to a button, and subsequently removed therefrom by breaking the bond between the lens and the alloy. An object of the invention is to provide a lens holder which mitigates the foregoing disadvantages.

According to the invention, a method of forming a lens holder includes mounting a support member on a lens-holding body, forming at least one contact surface on the support member, positioning a former on the or each contact surface so that a curved surface defined by the former engages the or each contact surface, introducing a settable mass of flowable material into a cavity defined between said curved surface and the lens-holding body, and removing the former from the or each contact surface after the material has set whereby the set material will define a surface for supporting a lens having a curved surface corresponding or substantially corresponding to the curved surfacae of the former.

Preferably, the method includes locating said support member in a socket or recess in the lens-holding body. If desired, the method may include providing a plurality of said support members on the lens-holding body to engage a toric surface on the former, the support members being arranged so as to engage the toric surface at positions which will be symmetrical about the axis of the base curve or cylinder of the toric surface. Preferably, four such support members are provided.

The support member may alternatively be annular and extend around said cavity. The periphery of the generally annular support member may be formed with an aperture or recess through which the flowable material is introduced into said cavity.

Preferably the aperture communicates with a bore in the lens-holding body through which air is to be drawn to create said suction.

The former may be a lens.

The settable mass of flowable material is preferably a material which is introduced in a molten state. In particular, the material may be a low melting point alloy such as an eutectic alloy of bismuth, indium, tin, lead and cadmium having a melting point in the region of 58° C.

The invention also includes a lens holder formed in accordance with the method set forth in any of the seven immediately preceding paragraphs.

The invention further includes a method of supporting a lens in a lens holder which includes mounting a support member on a lens-holding body, forming at least one contact surface on the support member, positioning a former on the or each contact surface so that a curved surface defined by the former engages the or each contact surface, introducing a settable mass of flowable material into a cavity defined between said curved surface and the lens-holding body, removing the former from the or each contact surface after the material has set, and using the surface defined by the set material to support a lens having a curved surface corresponding or substantially corresponding to the curved surface of the former.

The invention will now be described, by way of example only, with reference to the accompanying drawings in which:

FIG. 1 is an end view of a lens holder;

FIG. 2 is a cross-section of the lens holder shown in FIG. 1 on the line II—II in FIG. 1;

FIG. 3 is a view similar to FIG. 2 showing a former in position in the lens holder;

Figure 4:
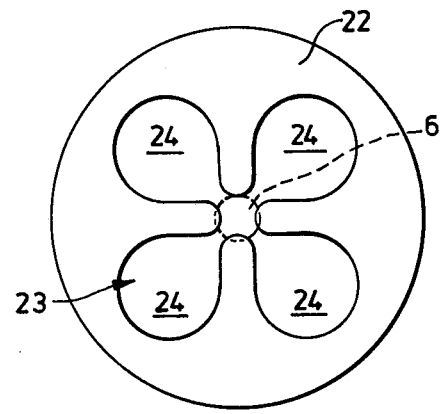
FIG. 4 is an end view of a sealing disc.

The lens holder comprises coaxial circular cross-section body portions 1, 2 into which extends a tapered bore 3 to enable the lens holder to be mounted on a hollow rotatable spindle (not shown) of a lens-grinding machine. The body portion 1 is formed with a lens-receiving recess 4 which has a substantially flat bottom surface 5. A bore 6 extends between the tapered bore 3 and the surface 5. The recess 4 has a peripheral wall 7 which is formed with a cut-out 8, the purpose of which will hereinafter be described. The periphery of the body portion 1 is formed with two flats 9 which locate two plates 10. The flats 9 intersect the internal surface of the wall 7 thereby forming two slots 12 in the wall 7. The plates 10 are secured to the body portion 1 by screws 13 and extend slightly beyond the upper end of the wall 7 as viewed in FIGS. 2 and 3 so as to locate flats usually formed at diametrically opposed positions on a toric lens blank.

Four pins 14 are located in sockets 15 formed in the body portion 1. The pins are preferably formed from a plastics material such as nylon which can be machined with a lens-grinding wheel. The lens holder shown in FIGS. 1 to 5 is particularly intended to support a toric surface of a lens on which a spherical surface is to be machined, and the pins 14 are positioned symmetrically about the base curve or cylinder curve axis 15 or 16 respectively of the lens to be supported in the holder. The pins 14 are machined into the form shown in FIGS. 3 and 5 to define contact surfaces 17. The bore 6 is then blanked off by a plug 11 of suitable material such as Plasticine (Plasticine is a Registered Trade Mark) or other material as shown at FIG. 3. A former 18 having a toric surface 19 corresponding or substantially corresponding to the toric surface of the lens to be supported in the holder is placed in position on the contact surfaces 17. As shown in FIG. 3, the plug 11 extends between the bore 6 and the former. The former may be formed from metal, plastics or other material or may, instead, be a lens having an appropriate toric surface for engagement with the contact surfaces 17 of 14. A molten alloy 20 is then introduced via the cut-out 8 into the cavity defined between the toric surface 19 and the recess 4 and is then allowed to set. The alloy is preferably an eutectic alloy of bismuth, indium, tin, leand and cadmium which has a melting point in the region of 58° C. However, a suitable alternative material could be used such as a thermosetting resin or other settable and flowable material. When the alloy 20 has solidified, the former 18 and the plug 11 are removed.

Figure 5:
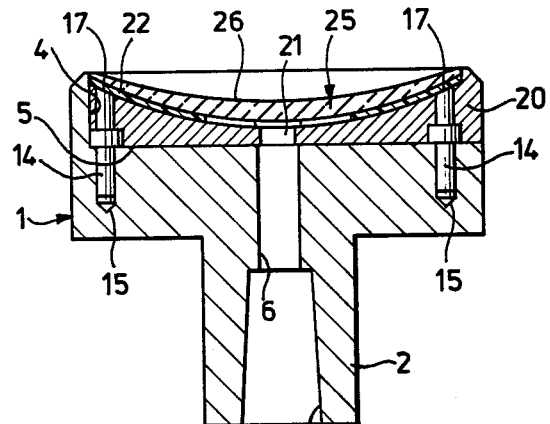
FIG. 5 is a view similar to FIG. 3 and showing a lens in position in the lens holder.

A disc 22 of rubber, neoprene or other resiliently deformable sheet material (constituting the aforesaid sealing means) is then placed on the toric surface of the solidified alloy 20. As shown in FIG. 4, the disc 22 is formed with a clover-leaf shaped aperture 23. The aperture 23 defines four areas 24 which will communicate with the bore 6 shown in broken lines in FIG. 4. The disc 22 may define a different number of areas 24 and the aperture 23 need not be of clover-leaf form. The lens 25 to be supported in the lens holder is then positioned as shown in FIG. 5 so that the disc 22 will sealingly engage both the toric surface of the alloy 20 and the toric surface of the lens 25. With the lens holder in position on the grinding machine spindle, air is withdrawn from the areas 24 through a space 21, defined in the alloy 20 after removing the plug 11, and through the bore 6 by applying suction to the hollow spindle of the machine. The suction will retain the lens 25 in the position shown in FIG. 5 to enable the grinding wheel of the machine to grind a spherical surface 26 on the lens 25. After the grinding operation has been completed, the lens 25 can be removed by relieving the suction. It is envisaged that the lens 25 could be attached to the solidified alloy by means other than suction and which would not require the presence of the disc 22.

Where it is desired to grind a toric surface on the lens using the method described, a former having an appropriate spherical surface may be used in conjunction with the alloy 20, and the lens subsequently located for the forming of a toric surface by means of the two plates 10.

Where a spherical surface is being formed on the lens in the lens holder, the plates 10 may be removed from the lens holder, if desired, after the alloy 20 has solidified.

As will be appreciated, only one alloy-casting step is necessary in the method described and subsequent lenses can be positioned quickly and easily in the lens holder. The machining of the pins 14 ensures that the contact surfaces 17 will position the former such that the lenses subsequently supported in the holder will be machined with the minimum of prism, for example consistently less than 0.5 mm.

Although the disc 22 defines open areas 24, the disc provides sufficient all round support and is sufficiently thin to reduce flexing of thin lenses to an absolute minimum during grinding. Although this is not always too important at the initial lens generating stage, it becomes more critical at the subsequent fining stage preceding smoothing and polishing.

Figure 6:
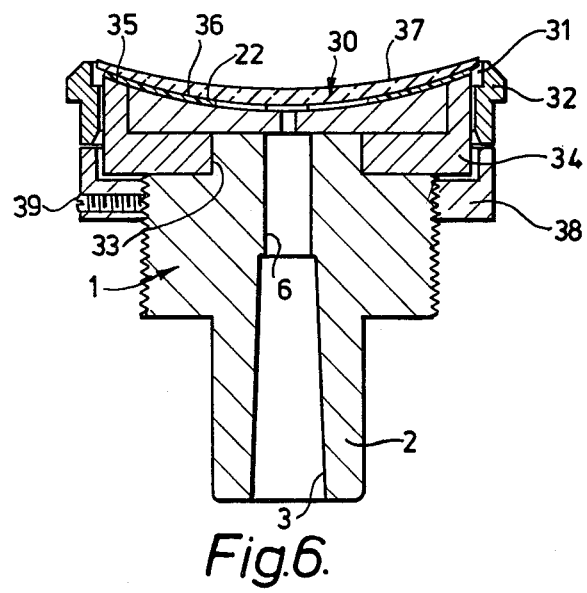
FIG. 6 illustrates a manner in which the lens holder can be adapted for use in the mass-production of spherical surfaces on lenses.

FIG. 6 illustrates the manner in which a lens holder similar to that shown in FIGS. 1 to 3 and FIG. 5 can be adapted to support one of a plurality of lenses 30 (one only of which is shown). Each lens 30 is located with clearance in a recess 31 formed in a carrier 32, and each carrier 32 is located in an incrementally rotatable worktable (not shown) for positioning the lenses 30 in turn automatically above the lens holder. The body portion 1 is formed with a projecting end or spigot 33 on which an annular plastics support sleeve 34 is located. When forming the lens holder, the sleeve 34 is first machined by a lens-grinding wheel to define a contact surface 35 which locates on the spherical undersurface of a former (not shown). The bore 6 is then blanked off with Plasticine (not shown) or other means which will extend between the bore 6 and the former. With the former in situ on the contact surface 35, a low melting point alloy 36 or other suitable material is introduced through an aperture or recess (not shown) in the sleeve 34 and enters the cavity between the former and the spigot 33. After the alloy has solidified, the former is removed together with the material used for blanking off the bore 6. A sealing disc, such as the disc 22, is then secured by a suitable adhesive to the spherical surface of the alloy 36. In use, the lens holder is located on the spindle of the machine, the spindle being rotatable and axially movable automatically relatively to the incrementally movable worktable. The worktable positions a lens 30 above the lens holder and the spindle moves upwardly to locate the carrier 32 on the sleeve 34. The carrier 32 is supported by a supporting ring 38 which is screw-threaded on to the body portion 1. The screw-threaded interconnection enables the vertical position of the ring 38 to be adjusted so that the spherical undersurface of the lens 30 will engage the disc 22 before the bottom of the carrier 32 engages the ring 38. The ring 38 may be locked in position on the body 1 by means of a grub screw 39. The spherical undersurface of the lens 30 corresponds or substantially corresponds to that of the former and the lens is held in position on the disc 22 by suction applied as described with reference to FIGS. 1 to 5. A spherical upper surface 37 is then ground on the lens 30, after which the suction is relieved, the spindle is lowered to disengage the carrier 32 and sleeve 34 and to release the lens 30, and the worktable is indexed to position a further lens above the lens holder.

The radially outer surface of the sleeve 34 and/or the adjacent radially inner surface of the carrier 32 may be curved or tapered to inhibit jamming of the carrier 32 on the sleeve 34 during location prior to machining the lens 30.

Figure 7:
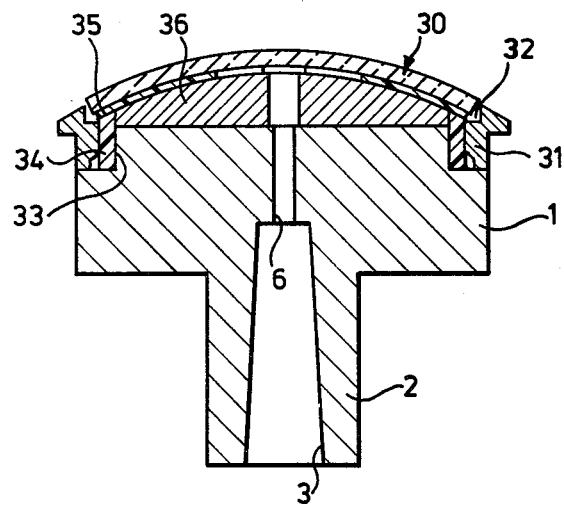
FIG. 7 is a view of a lens holder generally similar to the lens holder shown in FIG. 6, and showing the manner in which a lens can be supported with its convex side uppermost.

The lens holder shown in FIG. 7 is generally similar to that shown in FIG. 6, except that the vertical position of the ring 30 on the body portion is fixed, and parts corresponding to those in FIG. 6 carry like reference numerals. In FIG. 7, the lens 30 is arranged with its convex surface uppermost, and the depth of the carrier 32 is such that the spherical under surface of the lens will engage the disc 22 before the bottom of the carrier 32 engages the body portion 1. If desired the lens holders of FIGS. 1 to 3 and FIGS. 5 and 6 may locate the lenses with the convex surface uppermost.

Finger-nail receiving recesses may be formed in the alloy 20, 36 adjacent the former surface during casting to assist in removal of the former and, where necessary, removal of a lens after machining. Two recesses would be ideal, the recesses preferably being spaced apart by 180°.

We claim:
1. A method of forming a lens holder comprising mounting a support member on a lens-holding body, forming a curved contact surface on the support member, positioning a former on the curved contact surface so that a curved surface defined by the former seats on and generally follows the curvature of said curved contact surface, introducing a settable mass of flowable material into a cavity defined between said curved surface and the lens-holding body, and removing the former from the curved contact surface after the material has set whereby the set material and curved contact surface together define a permanent lens-supporting surface for a lens having a curved surface substantially corresponding to the curved surface of the former.

2. A method of forming a lens holder according to claim 1 comprising locating said support member in a socket in the lens-holding body.

3. A method of forming a lens holder according to claim 1 comprising providing a plurality of said support members on the lens-holding body to engage a toric surface on the former, the support member being arranged so as to engage the toric surface at positions which are symmetrical about the axis of the base curve of the toric surface.

4. A method of forming a lens holder according to claim 2 comprising providing a plurality of said support members on the lens-holding body to engage a toric surface on the former, the support member being arranged so as to engage the toric surface at positions which are symmetrical about the axis of the base curve of the toric surface.

5. A method of forming a lens holder according to claim 3 comprising providing four support members on the lens-holding body.

6. A method of forming a lens holder according to claim 1 wherein the support member is generally annular and extends around said cavity.

7. A method of forming a lens holder according to claim 2 wherein the support member is generally annular and extends around said cavity.

8. A method of forming a lens holder according to claim 6 wherein the periphery of the generally annualr support member is formed with an aperture or recess through which the flowable material is introduced into said cavity.

9. A method of forming a lens holder according to claim 1 comprising providing the surfaces of said set material with sealing means which sealingly engages said curved surface of the lens to be supported by the lens holder to enable the lens to be held in position by suction.

10. A method of forming a lens holder according to claim 9 wherein the sealing means is in the form of a sheet-like member which extends between said curved surface of the lens and the surface of the set material and which is formed with an aperture having edges which include radially inwardly directed lens supporting fingers and to which suction is to be applied to hold the lens in position in the holder.

11. A method of forming a lens holder according to claim 10 wherein the aperture communicates with a bore in the lens-holding body through which air is to be drawn to create said suction.

12. A method of forming a lens holder according to claim 1 wherein the former is a lens.

13. A method of forming a lens holder according to claim 1 wherein the settable mass of flowable material is a material introduced in a molten state.

14. A method of forming a lens holder according to claim 13 wherein the material is a low-melting point alloy.

15. A method of forming a lens holder, according to claim 14 wherein the material is an eutectic alloy of bismuth, indium, tin, lead and cadmium having a melting point in the region of 58° C.

16. A method of supporting a lens in a lens holder comprising mounting a support member on a lens-holding body, forming at least one curved contact surface on the support member, positioning a former on the curved contact surface so that a curved surface defined by the former seats on and generally follows the curvature of the curved contact surface, introducing a settable mass of flowable material into a cavity defined between said curved surface and the lens-holding body, removing the former from the curved contact surface after the material has set, and using the surface defined by the set material and said curved contact surface to support a lens having a curved surface substantially corresponding to the curved surface of the former.

17. A method of supporting a lens in a lens holder according to claim 16 comprising providing the surface of said set material with sealing means which sealingly engages said curved surface of the lens, and holding the lens in position by suction.

18. A method of supporting a lens in a lens holder according to claim 17 wherein the sealing means is in the form of a sheet-like member which extends between said curved surface of the lens and the surface of the set material and which is formed with an aperture having edges which include radially inwardly directed lens supporting fingers and to which suction is to be applied to hold the lens in position in the holder.

19. A method of supporting a lens in a lens holder according to claim 18 wherein the aperture communicates with a bore in the lens-holding body through which air is drawn to create said suction.

* * * * *

UNITED STATES PATENT AND TRADEMARK OFFICE
CERTIFICATE OF CORRECTION

PATENT NO. : 4,089,102

DATED : May 16, 1978

INVENTOR(S) : Peter Henry Hunt Soper et al

It is certified that error appears in the above-identified patent and that said Letters Patent are hereby corrected as shown below:

Column 2, line 61, after "former" (both occurrences) insert --18--.

Column 2, line 64, after "of" insert -- the pins --.

Signed and Sealed this

Nineteenth Day of September 1978

[SEAL]

Attest:

RUTH C. MASON
*Attesting Officer*

DONALD W. BANNER
*Commissioner of Patents and Trademarks*